(12) United States Patent
Ranno et al.

(10) Patent No.: US 12,487,421 B2
(45) Date of Patent: Dec. 2, 2025

(54) INTEGRATED FREEFORM OPTICAL COUPLERS AND FABRICATION METHODS THEREOF

(71) Applicant: Massachusetts Institute of Technology, Cambridge, MA (US)

(72) Inventors: Luigi Ranno, Cambridge, MA (US); Tian Gu, Fairfax, VA (US); Juejun Hu, Newton, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 303 days.

(21) Appl. No.: 18/329,059

(22) Filed: Jun. 5, 2023

(65) Prior Publication Data

US 2023/0393357 A1  Dec. 7, 2023

Related U.S. Application Data

(60) Provisional application No. 63/348,748, filed on Jun. 3, 2022.

(51) Int. Cl.
  *G02B 6/43* (2006.01)
  *G02B 6/30* (2006.01)
  *G02B 6/42* (2006.01)

(52) U.S. Cl.
  CPC .............. *G02B 6/43* (2013.01); *G02B 6/30* (2013.01); *G02B 6/4219* (2013.01)

(58) Field of Classification Search
  CPC ... G02B 6/43; G02B 6/30; G02B 6/34; G02B 6/4219
  See application file for complete search history.

(56) References Cited

U.S. PATENT DOCUMENTS

| | | | |
|---|---|---|---|
| 6,096,247 A | 8/2000 | Ulsh et al. | |
| 10,979,635 B2 | 4/2021 | Hu et al. | |
| 11,206,978 B2 | 12/2021 | Hu et al. | |
| 11,378,733 B2 * | 7/2022 | Yu | G02B 6/125 |
| 2020/0225401 A1 | 7/2020 | Hu et al. | |

FOREIGN PATENT DOCUMENTS

WO    2021071573 A1    4/2021

OTHER PUBLICATIONS

Gehring et al., "Broadband out-of-plane coupling at visible wavelengths," Optics Letters 44.20 (2019): 5089-5092, 4 pages.

(Continued)

*Primary Examiner* — Michael P Mooney
(74) *Attorney, Agent, or Firm* — Smith Baluch LLP

(57) ABSTRACT

The present technology is related to optics and optical systems, particularly to photonic packaging, optical coupling, optical interconnects, micro-optics, and their fabrication. The present technology includes free-form micro-optical coupler architectures and systems with superb optical performance and a high-throughput method of fabricating large-area coupler arrays for scalable manufacturing. Embodiments include chip-to-fiber-array, chip-to-chip, chip-to-interposer, and chip-to-free-space couplers for applications including photonic packaging, optical communications, LiDAR, optical trapping and manipulation, augmented reality, virtual reality, and sensing.

20 Claims, 8 Drawing Sheets

(56) References Cited

OTHER PUBLICATIONS

Shalaginov et al. "Design for quality: reconfigurable flat optics based on active metasurfaces." Nanophotonics 9.11 (2020): 3505-3534.
Yu et al. "Free-form micro-optics enabling ultra-broadband low-loss fiber-to-chip coupling." arXiv preprint arXiv:2112.14357 (2021), 11 pages.
Yu et al. "Optical Free-form couplers for high-density integrated photonics (OFFCHIP): a universal optical interface." Journal of Lightwave Technology 38.13 (2020): 3358-3365.
Yu et al. "Seamless hybrid-integrated interconnect network (SHINE)." 2019 Optical Fiber Communications Conference and Exhibition (OFC). IEEE, 2019, 38 pages.
Yu et al., "On-chip optical tweezers based on freeform optics," Optica 8, 409-414 (2021), 6 pages.
Zhang et al. "Electrically reconfigurable non-volatile metasurface using low-loss optical phase-change material." Nature Nanotechnology 16.6 (2021): 661-666.
Zhang, et al. "Broadband transparent optical phase change materials for high-performance nonvolatile photonics." Nature Communications 10.1 (2019): 4279, 9 pages.

\* cited by examiner

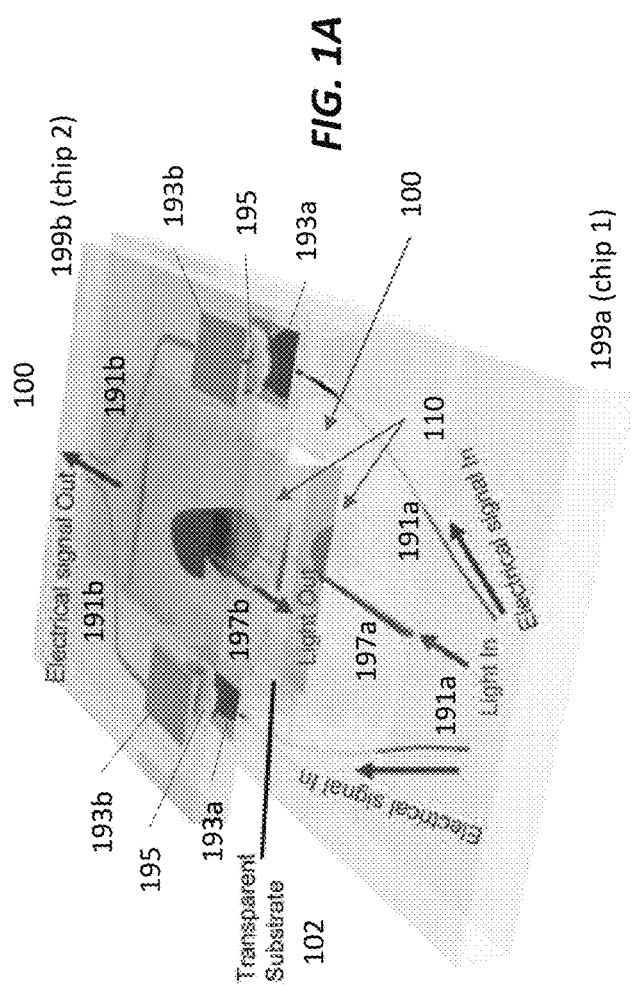
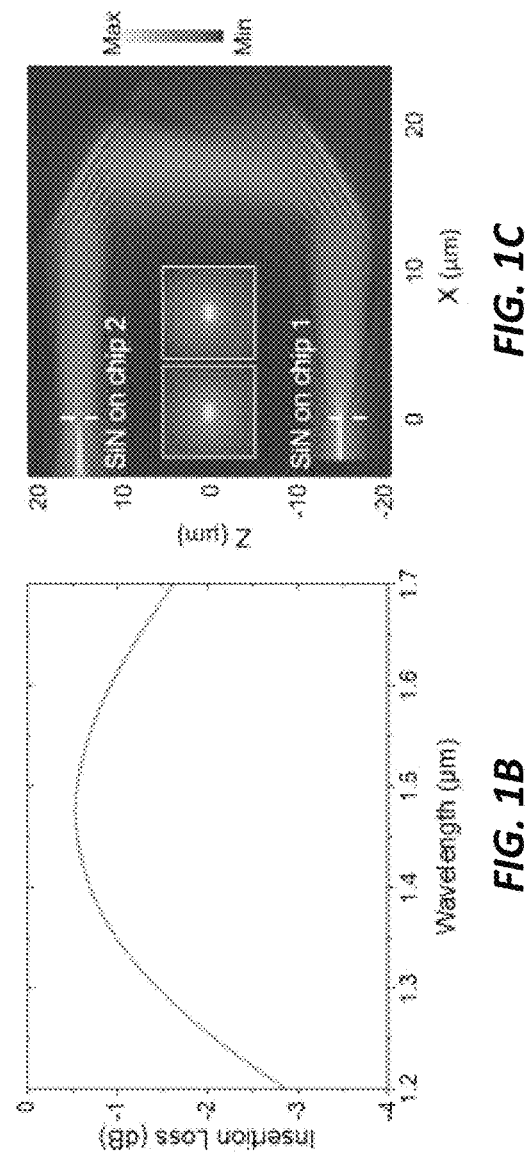
FIG. 1A
FIG. 1B
FIG. 1C

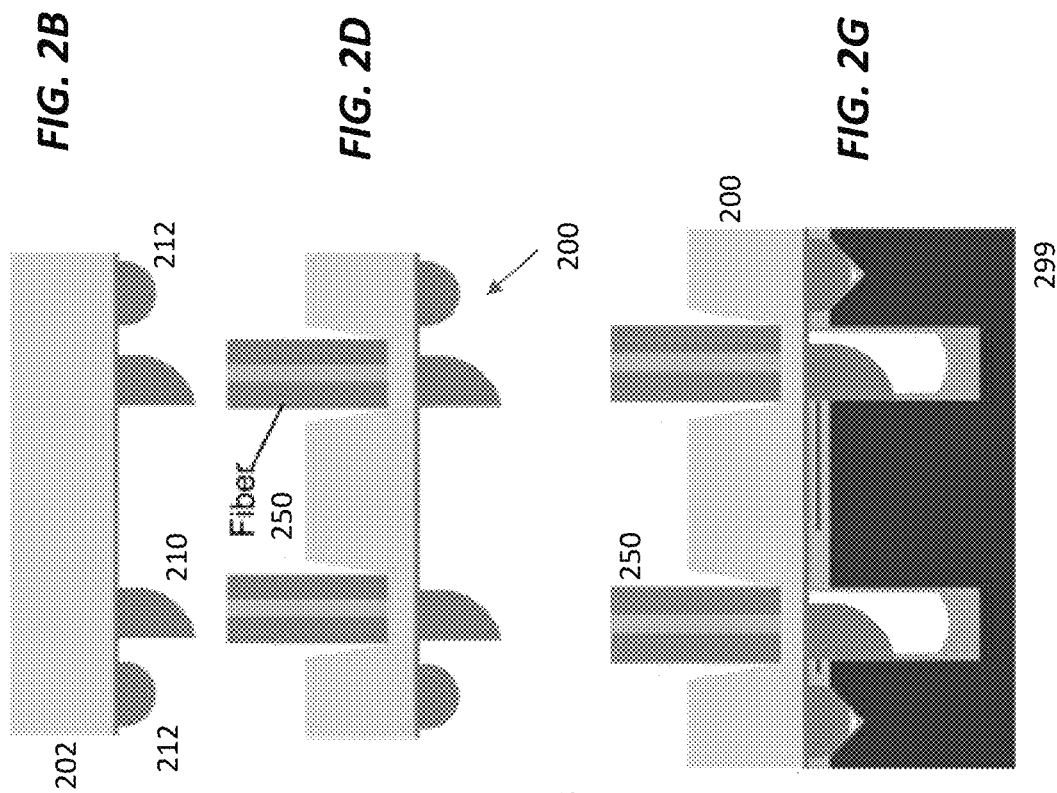
*FIG. 2A*
*FIG. 2B*
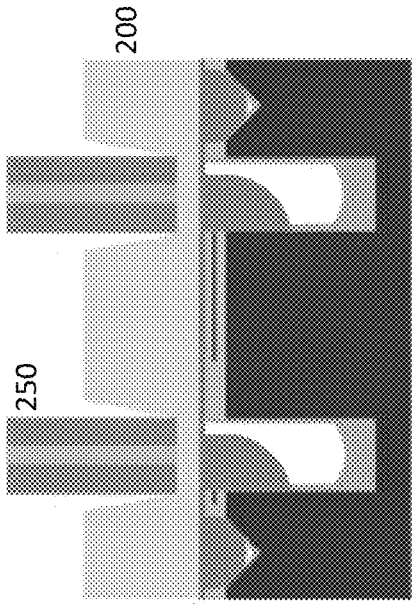
*FIG. 2C*
*FIG. 2D*
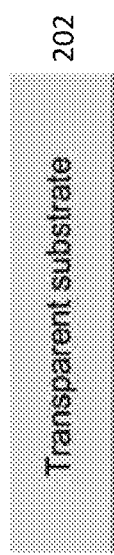
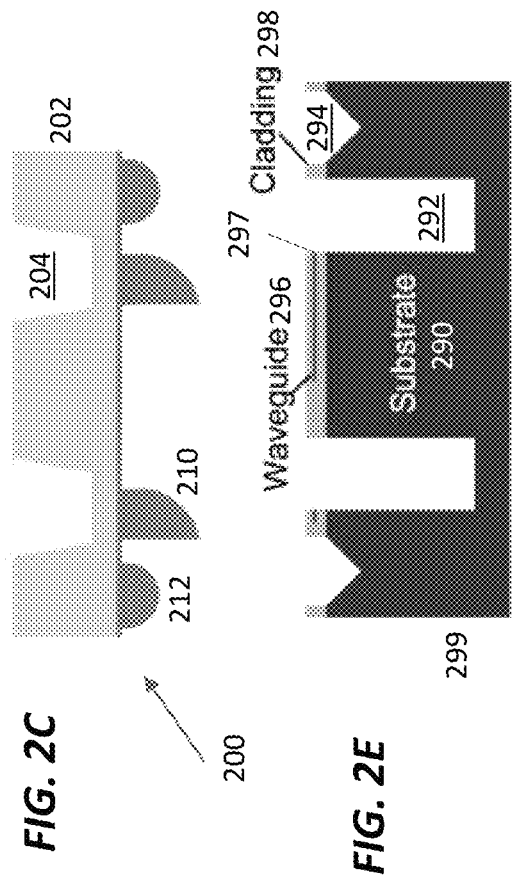
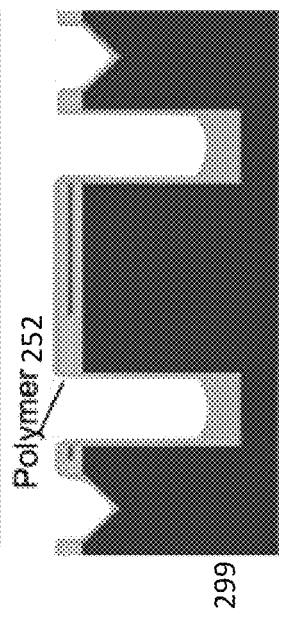
*FIG. 2E*
*FIG. 2F*
*FIG. 2G*

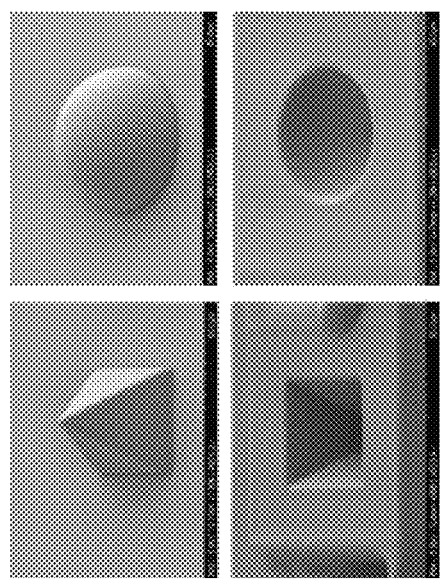
FIG. 3
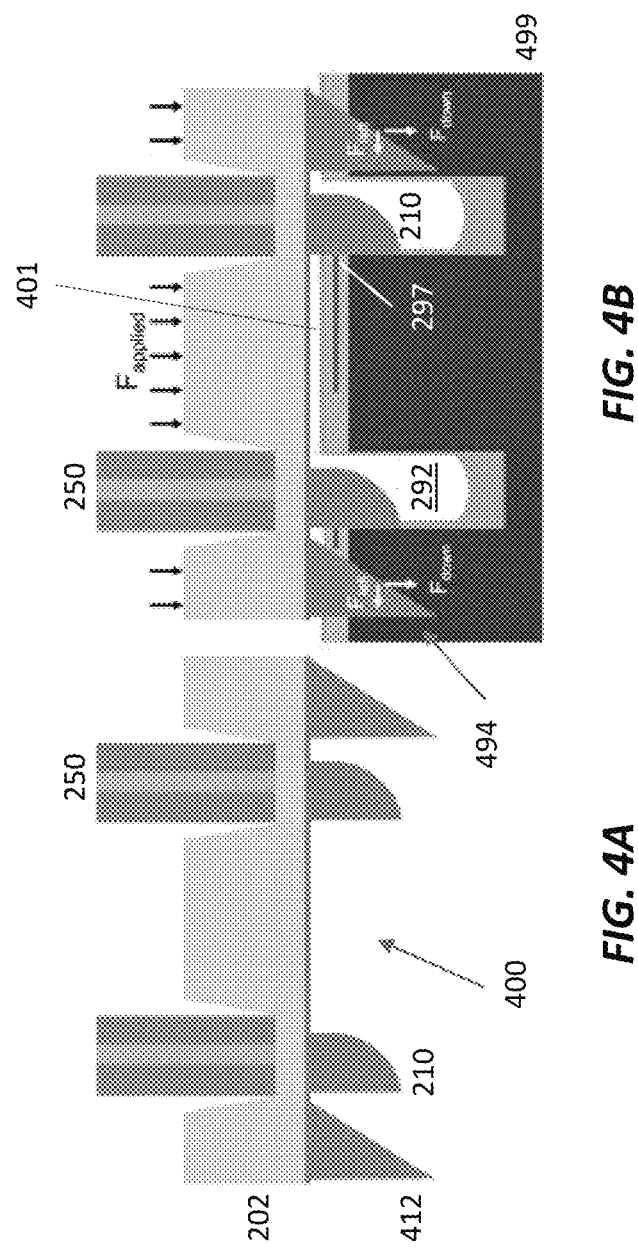
FIG. 4A
FIG. 4B

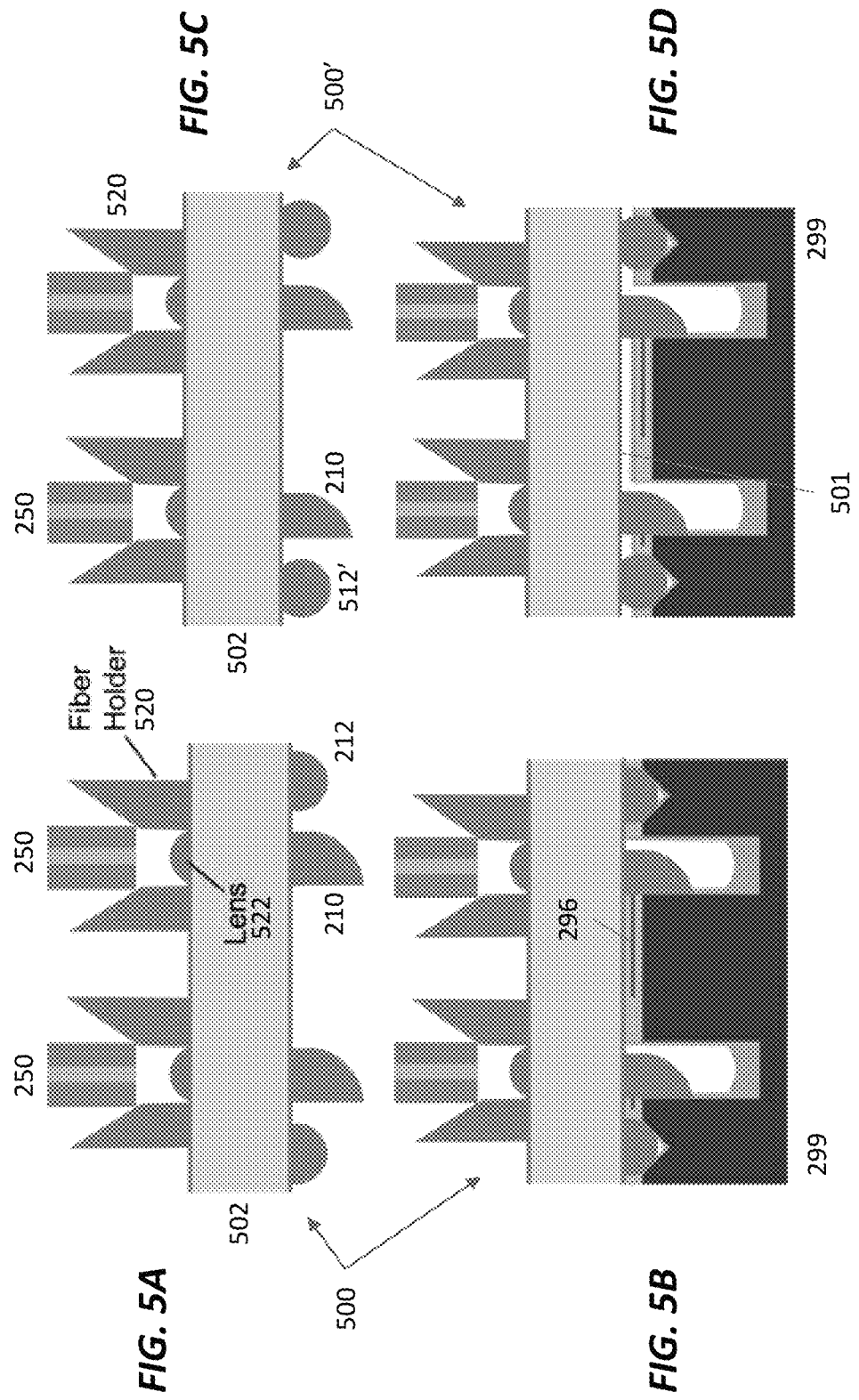

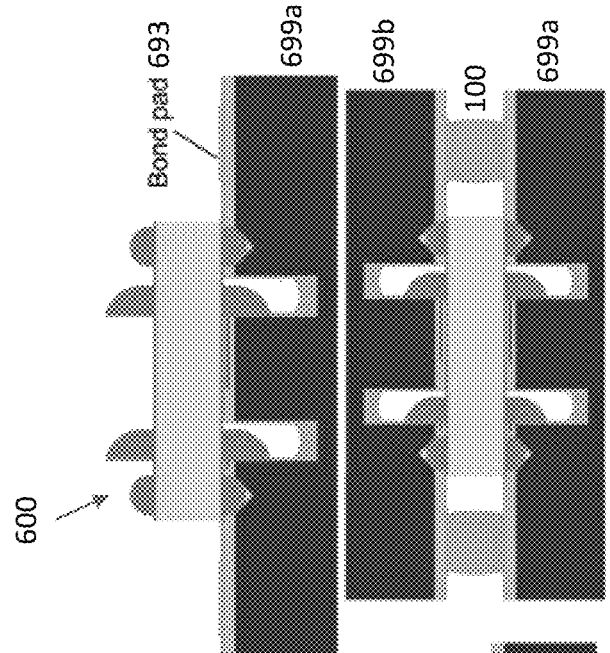
FIG. 6A
FIG. 6B
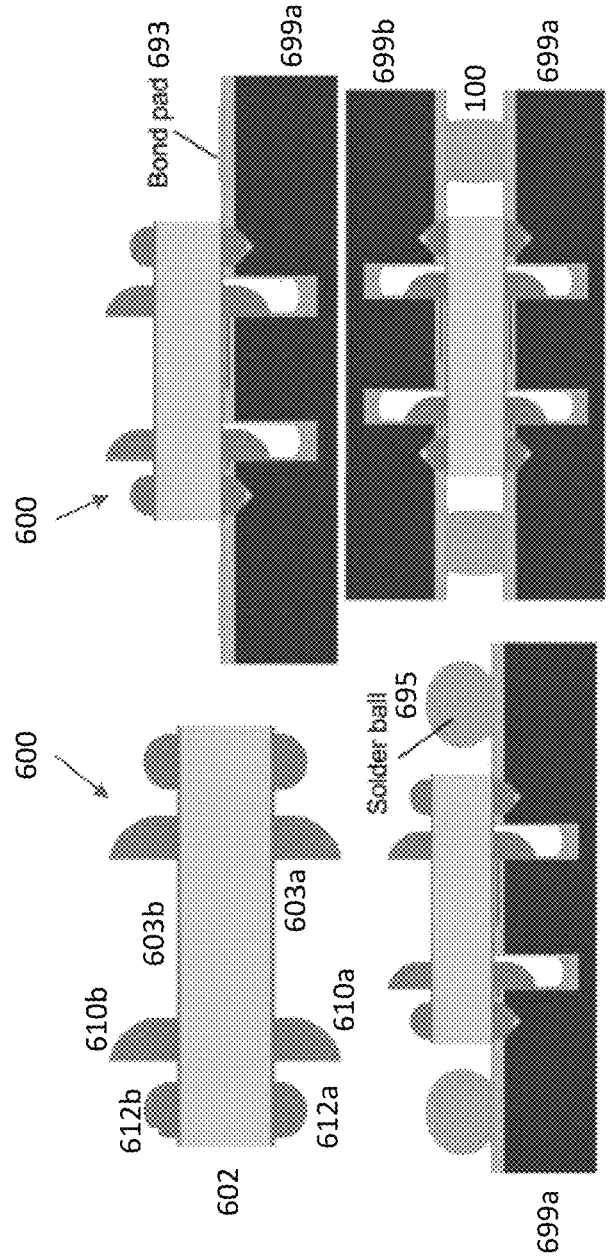
FIG. 6C
FIG. 6D

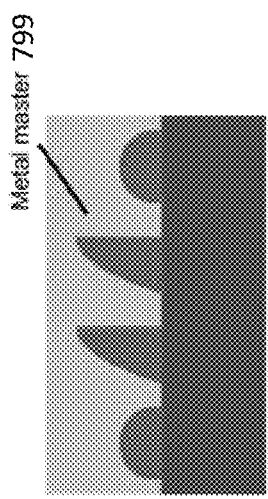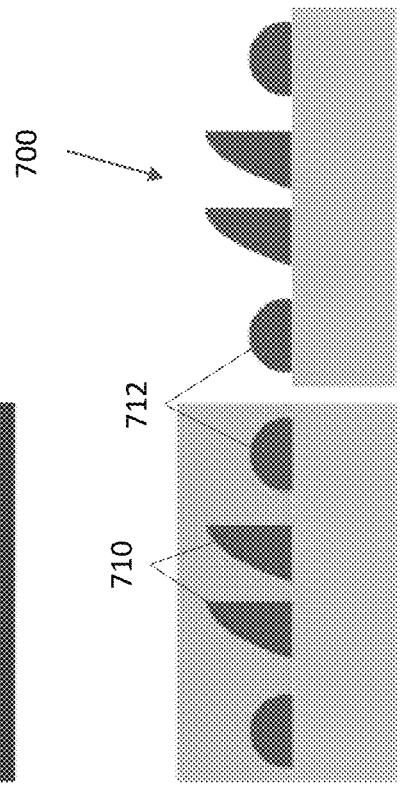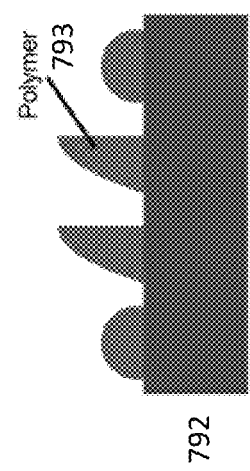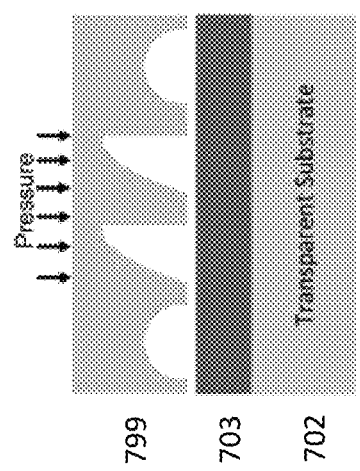
FIG. 7A  FIG. 7B
FIG. 7C  FIG. 7D  FIG. 7E

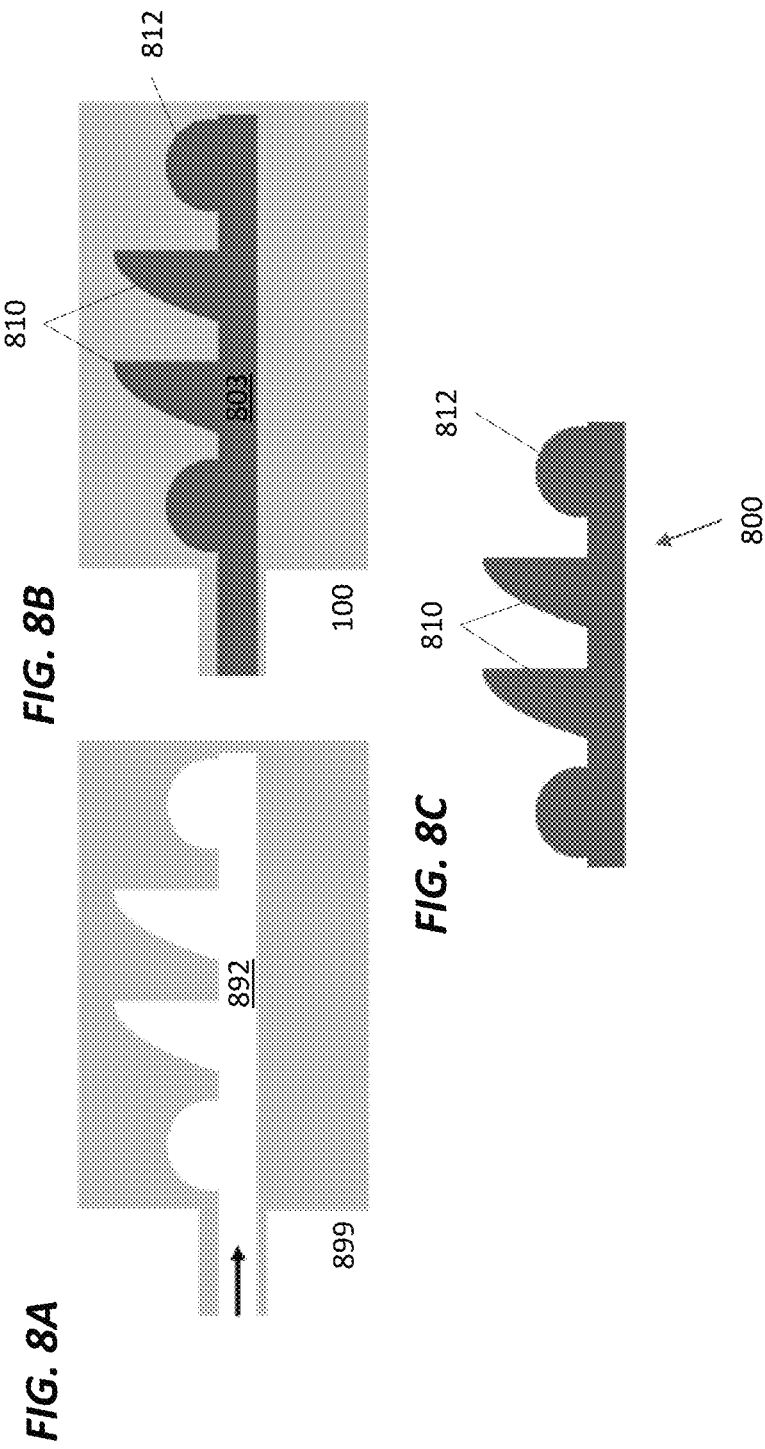

INTEGRATED FREEFORM OPTICAL COUPLERS AND FABRICATION METHODS THEREOF

CROSS-REFERENCE TO RELATED APPLICATION(S)

This application claims the priority benefit, under 35 U.S.C. 119(e), of U.S. Application No. 63/348,748, filed Jun. 3, 2022, which is incorporated herein by reference in its entirety for all purposes.

BACKGROUND

High-performance optical couplers are useful for interfacing on-chip waveguides with off-chip optical media, e.g., interconnecting waveguides and optical fibers within and between integrated photonic computer chips, as well as waveguide-to-free space coupling. High-performance optical couplers are a promising means of meeting the rapidly growing demand for high-density, high-bandwidth channels in large-scale data centers and high-performance computing systems.

Developing high-performance inter-chip and board-level optical interconnects (OI) and photonic packaging approaches has been a major challenge. Existing couplers are based on butt coupling or grating coupling, which have significant limitations. The integration density of input/output (I/O) channels of butt couplers is limited by the edge length of the chips. In addition, butt coupling typically places stringent requirements on optical alignment due to the small mode size in on-chip, high-index-contrast waveguide devices. These devices are typically made using precise, time-consuming active alignment during the assembly process. Furthermore, butt-coupled devices can only be characterized at the chip level after the photonic chips have been diced from a full wafer and generally cannot be tested and screened at the wafer scale.

Grating couplers are limited by their spectral bandwidth, which makes the adoption of wavelength division multiplexing (WDM) challenging. A grating coupler's efficiency is also sensitive to polarization, as well as fabrication and alignment accuracy, which is severely constrained by the mismatch between the optical mode sizes in waveguides and standard chip placement accuracy.

SUMMARY

Embodiments of the present technology include methods, apparatus, and fabrication protocols for coupling light into and out of an optical waveguide, optical fiber, or photonic chip, such as a photonic interposer, which may include a transparent substrate, polymer layer, free-form optical coupler (e.g., a metasurface), and mechanical alignment structure. The transparent substrate has a first side and a second side opposite the first side. The polymer layer is disposed on the first side of the transparent substrate and is formed into the free-form optical coupler, which extends from the first side of the transparent substrate and is configured to couple light through the transparent substrate, and the mechanical alignment structure, which also extends from the first side of the transparent substrate and is configured to mate with a complementary mechanical alignment structure.

The photonic interposer may include a cavity formed in the second side of transparent substrate opposite from the free-form optical coupler and an optical fiber with one end disposed in the cavity. In this case, the free-form optical coupler couples light through the transparent substrate and into the optical fiber.

In some cases, the polymer layer is a first polymer layer, the free-form optical coupler is a first free-form optical coupler, and the mechanical alignment structure is a first mechanical alignment structure. In these cases, the photonic interposer also includes a second polymer layer disposed on the second side of the transparent substrate and formed into a second free-form optical coupler and a second mechanical alignment structure. The second free-form optical coupler extends from the second side of the transparent substrate opposite from the first free-form optical coupler. And the second mechanical alignment structure extends from the second side of the transparent substrate. And in some cases, the second polymer layer is formed into a fiber holder opposite from the free-form optical coupler and configured to receive an end of an optical fiber. In these cases, the second polymer layer can be further formed into an optical component configured to focus, redirect, and/or spatially modulate light emitted from and/or coupled into the end of the optical fiber.

Still other embodiments include an assembly made of the photonic interposer and a photonic chip bonded to the photonic interposer and comprising an optical waveguide having a facet mated to a surface of the free-form optical coupler. In at least some of these embodiments, the free-form optical coupler extends into a cavity formed in the photonic chip and the complementary mechanical alignment structure is formed in the photonic chip. For instance, the facet can be formed on a wall of the cavity. Such an assembly may include another layer of polymer disposed on a surface of the photonic chip facing the photonic interposer. In addition, or instead, the mechanical alignment structure and the complementary mechanical alignment structure can form an air gap between the photonic chip and the photonic interposer.

In some examples of the assembly, the free-form optical coupler is a first free-form optical coupler, the photonic chip is a first photonic chip, the optical waveguide is a first optical waveguide, and the facet is a first facet. These examples also include a second photonic chip bonded to the photonic interposer and comprising a second optical waveguide having a second facet. In these examples, the photonic chip also comprises a second polymer layer that is disposed on the second side of the transparent substrate and formed into a second free-form optical coupler that extends from the photonic chip and into a cavity in the second photonic chip. The second free-form optical coupler is in optical communication with the second facet. In these examples, the first optical waveguide can be in optical communication with the second optical waveguide via the first free-form optical coupler, the transparent substrate, and the second free-form optical coupler. These examples may also include an electrical connection between the first and second photonic chips.

Another embodiment includes a method of making a photonic interposer. This method includes disposing a polymer layer on a first side of a transparent substrate, then forming (i) a free-form optical coupler extending from the transparent substrate and (ii) a mechanical alignment structure extending from the transparent substrate in the polymer layer. An optical coupler is also formed on a second side of the transparent substrate opposite from the free-form optical coupler.

Forming the optical coupler on the second side of the transparent substrate can include forming a cavity in the second side of the transparent substrate opposite the free-form optical coupler, in which case an end of an optical fiber can be disposed in the cavity. Alternatively, or in addition, the polymer layer is a first polymer layer and forming the optical coupler on the second side of the transparent substrate comprises disposing a second polymer layer on the second side of the transparent substrate, forming a fiber holder in the second polymer layer opposite the free-form optical coupler, and disposing an end of an optical fiber in the fiber holder.

If desired, the photonic interposer can be bonded to a photonic chip such that the free-form optical coupler extends into a cavity formed in the photonic chip in optical communication with a waveguide formed in the photonic chip. In some examples, bonding the photonic interposer to the photonic chip comprises placing a surface of the free-form optical coupler in direct contact with a facet of the waveguide formed along a wall of the cavity.

In some examples, the polymer layer is a first polymer layer, the free-form optical coupler is a first free-form optical coupler, the optical coupler is a second free-form optical coupler, and forming the second free-form optical coupler on the second side of the transparent substrate comprises disposing a second polymer layer on the second side of the transparent substrate. This second polymer layer can be formed into the second free-form optical coupler. Likewise, a second mechanical alignment structure can be formed in the second polymer layer extending from the second side of the transparent substrate. In some of these cases, the photonic interposer is bonded to a first photonic chip such that the first free-form optical coupler extends into a cavity formed in the first photonic chip in optical communication with a first waveguide formed in the first photonic chip and the photonic interposer is bonded to a second photonic chip such that the second free-form optical coupler extends into a cavity formed in the second photonic chip in optical communication with a second waveguide formed in the second photonic chip.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. 1A illustrates an opto-electronic chip-to-chip coupling scheme based on free-form micro-reflectors.

FIG. 1B is a plot of simulated insertion loss of light coupling between 220 nm×440 nm SiN waveguides (TE mode) on different chips in the chip-to-chip coupling scheme of FIG. 1A via two free-form reflective couplers.

FIG. 1C is a finite difference time-domain (FDTD) simulation of light coupling between SiN waveguides in different chips via free-form reflective couplers. The insets show the transverse intensity profiles of the fundamental mode (left) and the reflected beam (right).

FIGS. 2A-2G illustrate a wafer-scale fabrication process for making free-form reflective couplers for chip-to-fiber coupling.

FIG. 3 shows scanning electron microscope (SEM) images of matching alignment structures for aligning and mating a surface with free-form reflective couplers to another surface.

FIG. 4A shows a transparent substrate with optical fibers bonded to etched openings on one side and free-form reflective couplers and wedged alignment features formed on the other side.

FIG. 4B shows the transparent substrate of FIG. 4A fully bonded to another structure, with the wedged alignment features converting downward pressure into lateral motion for mechanical alignment.

FIG. 5A shows a chip-to-fiber interposer that uses mechanical structures (e.g., alignment features for optical fibers) and optical structures (e.g., free-form micro-reflectors) printed on opposite sides of a transparent substrate.

FIG. 5B shows the chip-to-fiber interposer of FIG. 5A with one side bonded to optical fibers and the other side bonded to and resting directly on a photonic chip.

FIG. 5C shows a chip-to-chip interposer with printed free-form optical structures and printed mechanical structures on a transparent substrate for aligning and coupling separate photonic chips.

FIG. 5D shows the chip-to-fiber interposer of FIG. 5D with one side bonded to optical fibers and the other side bonded to a photonic chip and separated from the photonic chip by an air gap.

FIGS. 6A-6D illustrate a wafer-scale fabrication process for bonding photonic chips to a chip-to-chip interposer.

FIGS. 7A-7E illustrate a process for replicating polymer structures.

FIGS. 8A-8C illustrate an injection-molding process for making a polymeric sheet with (arbitrary) free-form coupling and alignment structures.

DETAILED DESCRIPTION

Figure 9A:
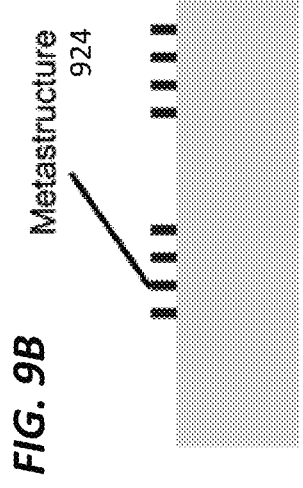
FIGS. 9A-9F illustrate processes for making surfaces with optical metasurfaces and/or free-form optical structures.

Here, we disclose architectures and methods for fabricating and assembling large-area, high-throughput photonic packaging and interconnections with high performance.

FIGS. 1A-1C illustrate an inventive photonic interposer 100 that connects a pair of photonic integrated circuits or photonic chips 199$a$ and 199$b$ to each other. The photonic interposer 100 includes a transparent substrate 102 patterned with one or more free-form micro-optical couplers 110. Each free-form micro-optical coupler 110 can have curved and/or planar surfaces whose sizes and shapes depend on the function(s) of the free-form micro-optical coupler 110. For instance, a free-form micro-optical coupler 110 that couples light into and/or out of optical fiber may have a surface that is a section of a paraboloid or parabolic prism. Another free-form micro-optical coupler 110 can have a mirror surface (e.g., a 45° inclined plane) in combination with a lens-like surface (e.g., a spherical section). A free-form micro-optical coupler 110 that couples light into and/or out of free space may have an ellipsoidal surface that focuses light to a point, e.g., for optical trapping. More generally, a free-form micro-optical coupler 110 can have a curved surface in the form of part of a paraboloid, ellipsoid, hyperboloid, torus, cone, sphere, cylinder, or an array of sub-surfaces of such geometries. The input/output surface of a free-form micro-optical coupler 110 can be planar, curved, tilted, or non-tilted. The shapes of a free-form micro-optical coupler's surfaces can be modified to account for non-idealities in the mode profile, etc., if desired.

Each free-form micro-optical coupler 110 can range in size from 1 micron to hundreds of microns, depending on the free-form micro-optical coupler's function, operating wavelength, and mode profile, among other parameters. A free-form micro-optical coupler 110 with a parabolic reflecting surface may have a length (along the waveguide propagation direction) of 10-150 µm, width of 5-150 µm, and height of 3-20 µm. Other dimensions/sizes are also possible.

The photonic interposer 100 can include free-form micro-optical couplers 110 and mechanical alignment features (not shown) on either side or both sides of the transparent substrate. For instance, the free-form micro-optical couplers 110 and mechanical alignment features can be on the same side(s) or opposite sides of the transparent substrate 102. Generally, the free-form micro-optical couplers 110 can be focusing, refracting, diffracting, and/or reflecting elements that are arranged to direct light through the transparent substrate 102. For instance, the free-form micro-optical couplers 110 can include collimating lenses, focusing lenses, curved reflective surfaces, prisms, meta-optics, and/or metasurfaces. The free-form micro-optical couplers 110 can also be arranged to couple light into and out of waveguides formed in and/or on the transparent substrate 102. They can also be arranged to couple light into free space, optical fibers, or other waveguides or optical components.

In FIG. 1A, the photonic interposer 100 includes two free-form micro-optical couplers 110 that extend from opposite surfaces of the transparent substrate 102 and into respective cavities formed in the photonic chips 199a and 199b. These cavities can be trenches or other depressions etched into the photonic chips 199a and 199b to accommodate the free-form micro-optical couplers 110. The free-form micro-optical couplers 110 couple light from a 220 nm×440 nm SiN waveguide 197a in one photonic chip 199a into another SiN waveguide 197b on the other photonic chip 199b.

The photonic chips 199a and 199b can be bonded to each other and/or to the photonic interposer 100 with adhesives, solder, or other means. Depending on the design of the mechanical alignment features, the two photonic chips 199a and 199b may or may not be in direct mechanical contact with each other after bonding. In FIG. 1A, for example, the photonic chips 199a and 199b are flip-chip bonded to each other using solder bumps 195 on opposite sides of the photonic interposer 100. The solder bumps 195 provide mechanical stability and inter-chip electrical connections. The connect conductive traces 191a on the lower photonic chip 199a with conductive traces 191b on the upper photonic chip 199b on the upper photonic chip 199b via conductive bonding pads 193a the lower photonic chip 199a and conductive bonding pads 193b on the upper photonic chip 199b.

In a similar fashion, the free-form micro-optical couplers 110 act as "optical solder bumps" that enable transmission of light between the two photonic chips 199a and 199b with little to no losses. Each free-form micro-optical coupler 110 has one or more reflective surfaces that direct and reshape light beams out-of-plane to a corresponding mating coupler via specular reflection or total internal reflection. Light coupled into one of the couplers 110 passes through the transparent substrate 102 and is collected by the corresponding mating coupler on the opposite side of the transparent substrate 102 and redirected into the corresponding photonic chip. Alternatively, the corresponding mating coupler can couple the reflected light into or from an appropriately positioned optical fiber (array). The free-form coupler may couple light from one input channel to one or multiple output channels.

FIGS. 1B and 1C show the simulated performance of the photonic interposer 100 in FIG. 1A. FIG. 1B is a plot of the simulated insertion loss versus wavelength of light coupling from the SiN waveguide 197a (TE mode) in the lower photonic chip 199a into the SiN waveguide 197b in the upper photonic chip 199b via the free-form reflective couplers 110. The insertion loss is less than 3 dB over a 500 nm wavelength range, which is significantly better than grating couplers, whose coupling efficiencies tend to have pronounced wavelength dependence.

FIG. 1C shows a finite-difference time-domain (FDTD) simulation of light coupling from the lower photonic chip 199a into the upper photonic chip 199b via the free-form reflective coupler 110. Insets are the transverse intensity profiles of fundamental mode (left) and the reflected beam (right). Light exits a SiN waveguide in the lower photonic chip 199a, expands and totally internally reflects from a curved surface of the lower free-form reflective coupler 110, propagates through the transparent substrate 102, and totally internally reflects from a curved surface of the upper free-form reflective coupler 110 into a SiN waveguide in the upper photonic chip 199b. The curved surfaces both totally internally reflect and focus the beam to ensure good coupling (low coupling/insertion loss).

FIGS. 2A-2G illustrate a process for making a photonic interposer 200 and for assembling that photonic interposer 200 with optical fibers and a photonic chip. The photonic interposer 200 includes a transparent substrate 202, which may be rigid or flexible. Suitable materials for the transparent substrate 202 are transparent at the photonic interposer's operating wavelength(s) and include fused silica, borosilicate, or other kinds of optical glass; semiconductors like sapphire, AlN, GaN, SiC, or double side polished Si; rigid polymer substrates like polymethyl methacrylate (PMMA); flexible polymer substrates like polydimethylsiloxane (PDMS). A flexible transparent substrate is compatible with roll-to-roll coupler array imprint fabrication. The type of polymer 203 can be almost arbitrary, giving great flexibility in the design of the free-form optical couplers and other structures that can be formed in the polymer 203. In addition, the surface of structures formed in the polymer 203 can be treated to, e.g., bind strongly to an analyte, which could be useful for the fabrication of sensors at wafer scale.

The transparent substrate 202 can be a plain sheet or slab of material or it can be a patterned or composite, depending on the application. Light generally diverges less when propagating through a thinner transparent substrate 202 (e.g., with a thickness of 100 µm, 75 µm, 50 µm, or less). Alternatively, the transparent substrate 202 can be thick to provide greater mechanical stability with free-form micro-optical couplers shaped and/or configured to compensate for undesired divergence. A slab-like transparent substrate 202 can support hybrid integration of functional components thanks to greater mechanical stability. The transparent substrate 202 could also be thinned down using a monolithic fabrication approach (e.g., molding the substrate together with the components) or employing substrate removal/release/thinning methods.

One side of the transparent substrate 202 is coated with a layer of polymer 203. Suitable types of polymer 203 include polymers that are transparent at the photonic interposer's operating wavelength(s). (The mechanical alignment features/structures can be transparent, translucent, or opaque.) The polymer's refractive index depends on the function(s) of the free-form optical coupler(s). For a free-form optical coupler that is large and gradually expands the beam's mode profile, most polymers have enough index contrast with the surrounding media to ensure total internal reflection. For smaller structures (as is the case when working at shorter wavelengths, e.g., visible light) or in general when the surface that totally internally reflects light steeper, then a polymer with a higher refractive index is advantageous. If desired, the coupler's reflective surface can be coated with a reflective coating (e.g., a metallic or dielectric coating), so the polymer material choices are not limited by the total internal reflection condition for coupling light.

As shown in FIGS. 2A and 2B, one or more free-form optical couplers 210 and optional mechanical alignment structures 212 are formed in the polymer 203 using grayscale lithography, two-photon polymerization (TPP), another direct-write or 3-D printing process, an imprint/embossing process, or a combination of such processes. The free-form optical couplers 210 and mechanical alignment features 212 can be defined in the same patterning step/process or in separate patterning steps/processes. In some cases, a micro-optical coupler 210 can serve both optical coupling and mechanical alignment functions, so there may not be any separate mechanical alignment structures. The coupler's reflective surface may be further coated with a reflective coating (e.g., metallic, dielectric coatings, etc.).

For an imprint/embossing process, a mold with shapes inverse to those of the coupler structures and mechanical alignment structures is fabricated first, e.g., using lithography or TPP processes, then pressed against the polymer layer 203, which may be heated to reduce its viscosity, and released to leave the free-form optical couplers 210 and mechanical alignment structures 212. Advantages of using an imprint/embossing process include high throughput and large-area compatibility (e.g., via a roll-to-plate nanoimprint process), enabling scalable manufacturing of the coupler array.

Mechanical alignment features can also be lithographically patterned on one or both sides of the same transparent substrate 202. In FIG. 2C, the alignment features are holes 204, each with a size matching that of an optical fiber 250, etched into the side of the transparent substrate 202 opposite the side coated with polymer 203. The hole sidewalls can be sloped to relax the alignment tolerance and mechanically guide the optical fibers 250 to position as they are inserted into the holes 204 as shown in FIG. 2D. The fiber holes 204 may be further shaped and coated with a reflective coating to provide optical coupling in addition to the mechanical alignment function.

Other suitable mechanical alignment structures include matching mechanical alignment structures like the square pyramid, pyramidal depression, hemisphere, and hemispherical depression shown in FIG. 3. Matching mechanical alignment structures can be patterned or etched on the opposing surfaces of the photonic interposer 202 and a photonic chip 299 to which the photonic interposer 202 will be bonded.

Once the photonic interposer 200 has been made, it can be mated or bonded to a photonic chip 299 as shown in FIGS. 2E-2G. The photonic chip 299 can include deep trenches 292 and mechanical alignment features (shallow trenches or depressions) 294 for receiving the free-form micro-optical couplers 210 and mechanical alignment features 212, respectively, on the photonic interposer 200. The photonic chip 299 also includes at least one exposed waveguide 296, optionally coated with a cladding layer 298, that extends to a waveguide facet 297 at the edge of one deep trench 292 and is to be coupled to one of the free-from micro-optical couplers 210. If desired, a thin polymer layer can be spin-coated or otherwise disposed on the photonic chip 299 to prevent air gaps from forming between the couplers 210 and the waveguide facets 297 as shown in FIG. 2F.

The photonic interposer 200 can be bonded to the photonic chip 299 through the application of mechanical pressure and/or heat as shown in FIG. 2G. The photonic interposer 200 is aligned to the photonic chip 299 such that each free-from optical coupler 210 extending from the surface of the photonic interposer 200 fits into a corresponding deep trench 292 in the photonic chip 299. In this case, each free-from optical coupler 210 also has a flat or planar surface that can fit against the waveguide facet 297 (and wall) of the corresponding deep trench 292. Likewise, each mechanical alignment structure 212 fits into a corresponding receptacle or mechanical alignment feature 294 in the photonic chip 299. Once the optical couplers 210 are fit into the deep trenches 292 and the mechanical alignment structures 212 are fit into the mechanical alignment features 294, the photonic interposer 200 and photonic chip 299 are pushed or pressed together and/or heated so that the polymer 252 on the photonic chip 299 bonds to the polymer 203 on the photonic interposer 200. (The optical fibers 250 can be coupled to the photonic interposer 200 before and/or after the photonic interposer 200 is bonded to the photonic chip 299.)

The facet at the end of the waveguide 296 can be exposed via a deep etch that also forms the trench(es) 292. The deep etch step is usually part of the standard photonic foundry fabrication process flow and is used to create, for example, dicing trenches. The waveguide 296 can be tapered near its facet 297 to increase the coupling efficiency. The photonic interposer 200 is then attached to the photonic chip 299 with assistance of the mechanical alignment structures 212 and 294 as described above and shown in FIG. 2G.

FIGS. 4A and 4B illustrate a photonic interposer 400 with mechanical alignment features 412 with a 'sliding wedge' shape and a photonic chip 499 with corresponding mating holes 494. The 'sliding wedge' shape mechanical alignment features 412 partially translate downward pressure applied during bonding into an in-plane force which presses the couplers 210 and the waveguide facets 297 together closely, as shown in FIG. 4B. The size of the wedges 412 may be equal to or bigger than the mating holes 494. If the wedges 412 are taller and wider than the mating holes 494, there may be a gap 401 between the opposing surfaces of the photonic interposer 400 and the photonic chip 499 as shown in FIG. 4B. In this example, optical fibers 250 are bonded to the far side of the photonic interposer 400, but a second photonic chip or even another photonic interposer can be bonded to the far side of the photonic interposer 400 instead to form a chip-to-chip or chip-to-interposer assembly.

To prevent air gaps between the micro-optical couplers 210 and the exposed facets 297 of the on-chip waveguides 296, a thin layer of (un-crosslinked) epoxy adhesive can be applied to the facets 297 and/or surfaces of the micro-optical couplers 210 prior to bonding. In its un-crosslinked form, each adhesive layer can deform when pressed between the facet 297 and coupler 210, eliminating possible air gaps between the coupler 210 and the waveguide facet 297. Once the bonding between the photonic interposer 400 and photonic chip 499 is established, the epoxy layer can be cross-linked with flood ultraviolet (UV) light exposure (e.g., through the transparent substrate 202 of the photonic interposer 400) or a thermally cured to form a permanent index-matched connection between the coupler 210 and the facet 297.

FIGS. 5A-5D show photonic interposers 500, 500' with an alternative chip-to-fiber geometry. Rather than having a transparent substrate 502 with etched holes to receive and align optical fibers 250, these photonic interposers 500, 500' include structures, called fiber holders 520, that hold the fibers 250 in place. These fiber holders 520 are defined additively (e.g., by nanoimprinting) or using a combination of subtractive and additive formation approaches on the surface of the transparent substrate 502 opposite to the surface with the couplers 210 as shown in FIGS. 5A and 5C. The fiber holders 520 align the optical fibers 250 laterally and longitudinally with respect to the photonic interposers 500, 500' and the free-form optical couplers 210. The optical fibers 250 can be mated or secured to the fiber holders 520 before or after the photonic interposers 500, 500' are bonded to the photonic chips 299 as described above, with alignment features 512, 512' that provide lateral and longitudinal (vertical alignment). FIGS. 5A and 5B show shorter alignment features 512 that allow direct contact of the opposing surfaces of the photonic interposer 512 and the photonic chip 299, whereas the taller alignment features 512' in FIGS. 5C and 5D provide an air gap 501 between the photonic interposer 512' and the photonic chip 299.

Optical elements such as lenses 522 may also be defined and co-designed with the fiber holders 520 and freeform couplers 210 to reshape (e.g., collimate or focus) and/or redirect light beam coupled into and/or out of the optical fibers 250. For example, the focal lengths of the lenses 522 may be selected to collimate the beams emitted by the optical fibers 250 given the distance at which the fiber holders 520 hold the optical fibers 250 away from the lenses 522. Alternatively, the focal lengths of the lenses 522 and free-form optical couplers 210 may be selected for the lowest possible coupling or insertion loss into the waveguides 296 in the photonic chip 299.

FIGS. 6A-6D illustrate a process for making a chip-to-chip photonic interposer 600 like the one shown in FIG. 1A and assembling the photonic interposer 600 between a pair of photonic chips 699a and 699b. FIG. 6A shows the photonic interposer 600, which includes a transparent substrate 602, such as plain sheet or slab of glass or plastic, that is coated on opposite sides with polymer layers 603a, 603b. Free-form optical couplers 610a, 610b and mechanical alignment features 612a, 612b are formed in these polymer layers 603a, 603b using imprinting, embossing, or another suitable process as described above with respect to FIGS. 2A-2G. In this example, the free-form optical couplers 610a, 610b extend from the transparent substrate 602 and are aligned opposite each other so that they couple light through the transparent substrate 602, between planes parallel to and on opposite sides of the transparent substrate 602. The free-form optical couplers 610a, 610b may be curved or otherwise shaped to focus or collimate this light for low insertion loss/high coupling efficiency.

The photonic interposer 600 is bonded to a first photonic chip 699a, which may be identical or similar to the photonic chip 299 in FIGS. 2A-2G, as described above, as shown in FIG. 6B. Both photonic chips 699a, 699b have exposed bond pads 693 that are used to form electrical connections between the photonic chips 699a, 699b. Solder balls 695 are deposited onto the bond pads 695 on the first photonic chip 699a as shown in FIG. 6C, then second photonic chip 699b is bonded to the first photonic chip 699a and the photonic interposer 600. For example, the first photonic chip 699a and second photonic chip 699b are bonded to each other using a solder reflow process that transforms the solder balls 695 to form good electrical interconnects between the first photonic chip 699a and second photonic chip 699b as shown in FIG. 6D. The resulting assembly includes the photonic interposer 600 sandwiched between and optically and electrically coupling the first photonic chip 699a and second photonic chip 699b.

FIGS. 7A-7E show a replication process for embossing or imprinted a polymer layer into free-form optical couplers and/or mechanical alignment structures like those in the photonic interposers described above and shown in FIGS. 1A, 2A, 2B, 4A, 4B, 5A-5D, and 6A-6D. First, polymeric structures 793 are defined on an arbitrary substrate 792 as shown in FIG. 7A. The polymeric structures 793 may be fabricated using multi-photon lithography, greyscale lithography, or any other suitable techniques. Next, a metal master mold 799 is formed encasing the fabricated polymeric structures 793 as shown in FIG. 7B. This could be achieved, for instance, by depositing a metallic seed layer on the polymeric structures 793, then electroforming the seed layer with nickel. The metal master mold 799 may be surface treated to facilitate demolding.

FIGS. 7C-7E show how the metal master mold 799 may then be used to replicate the initial structures 793, through, for instance, hot embossing or nano imprinting. A film of the desired polymer 703 (which could be different than the polymer 793 used to produce the metal master mold 799) is deposited onto a transparent substrate 702 as shown in FIG. 7C. The metal master mold 799 may not be fabricated at a wafer scale, since tools capable of imprinting a mold multiple times on a single wafer with good alignment are available. Then, the metal master mold 799 is pressed down onto the polymer film 703 (heating or UV illumination may also be applied) as shown in FIG. 7D. Lastly, demolding of the metal master mold 799 releases the newly formed replicated polymer structures, which may include free-form optical couplers 710 and mechanical alignment structures 712, to yield a photonic interposer 700. If desired, this molding process can be performed on both sides of the transparent substrate 702 to yield a photonic interposer like the ones shown in FIGS. 5A-5D and 6A-6D.

FIGS. 8A-8C illustrate how to fabricate a polymeric sheet 800 with arbitrary structures, including free-form optical couplers 810 and mechanical alignment structures 812, through injection molding. The polymeric sheet 800 can be used in place of a transparent substrate to provide a convenient and robust yet flexible carrier for the free-form optical couplers 810 and mechanical alignment structures 812. In FIG. 8A, an injection mold 899 is formed, e.g., using the same method used to produce the metal master mold described above with respect to FIGS. 7A-7E. In FIG. 8B, polymer 803 is injected into the injection mold 899 and allowed to harden or cure into the polymeric sheet 800 before being released from the injection mold 899.

The polymeric sheet 800 can act as a photonic interposer by itself or bonded to a (more rigid) substrate for support, with the polymeric sheet 800/substrate acting as the photonic interposer, depending on the thickness and rigidity of the polymeric sheet 800. The polymeric sheet 800 can also be bonded to a photonic chip; e.g., the polymeric sheet 800 may be a self-supporting film that can be stamped directly onto a photonic chip.

Figure 9B:
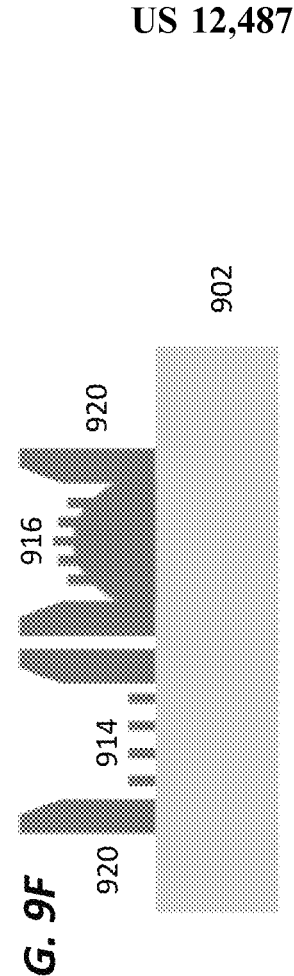

FIGS. 9A-9F illustrate photonic interposers with metasurfaces or diffractive optical elements in addition to or instead of refractive lenses. A metasurface can be formed by depositing a layer 923 of dielectric, semiconductor, or metal onto a transparent substrate 902 as shown in FIG. 9A, then patterning (e.g., using lithography or nanoimprint methods) that layer 923 into one or more metasurface structures 924, also called metasurfaces, meta-optics, or meta-structures, as shown in FIG. 9B. The meta-structure 924 can be configured to perform one or more of many types of wavefront modulation functions, including but not limited to beam shaping, deflection, splitting, or generation of a desired light distribution pattern. The meta-structure 924 may also provide different functions for light of different properties (e.g., wavelength, polarization). The meta-structure comprises one or more 2-D arrays of sub-wavelength optical structures (also known as meta-atoms). Exemplary meta-atom geometries may include cylindrical, rectangular, disks, freeform, or any other suitable shapes or combinations of different shapes, etc. The pitch of the meta-atoms may have any suitable shape and period (e.g., square, rectangular, or hexagonal). The pitch may also be aperiodic, with varying or random distances between adjacent meta-atoms. The meta-atoms can be configured to spatially modulate the phase, amplitude, and/or polarization of incident light. The meta-atoms may have the same or different geometries, dimensions, and orientations. The metasurface may also be formed on the photonic chip, waveguide, and/or optical fiber for light coupling. For more information on meta-structures and meta-atoms, see U.S. Pat. No. 10,979,635, which is incorporated herein by reference in its entirety for all purposes.

Figure 9C:
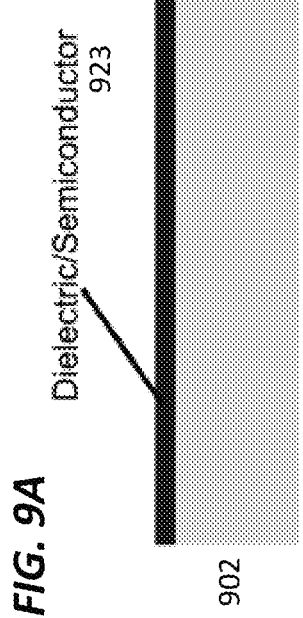
Figure 9D:
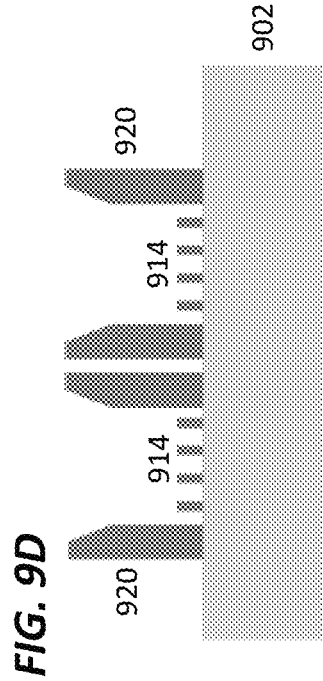

Afterwards, polymeric structures, such as optical and/or mechanical alignment structures (e.g., for optical fibers), may be fabricated on the transparent substrate 902 using the replication processes described above. For example, FIG. 9C shows polymeric fiber holders 920 that can be used to position and hold optical fibers (not shown) above respective metasurface structures 924, which may focus or collimate light emitted from the optical fibers. Alternatively, the meta-structures 924 may be used to couple light into free-space, another chip, a waveguide, or another optical component. Meta-structures 914 and bulk polymeric structures, such as fiber holders 920 or other mechanical alignment structures, can be fabricated from a polymer layer in a single pattern replication process as shown in FIG. 9D.

Figure 9E:
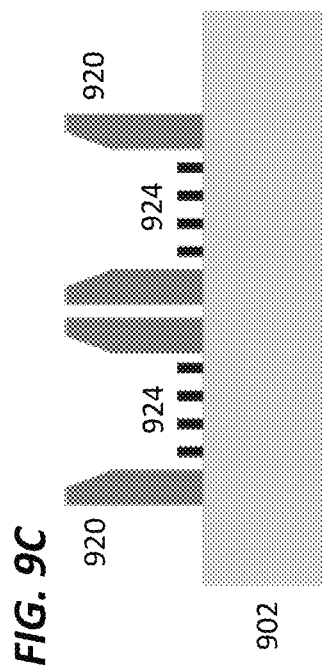
Figure 9F:
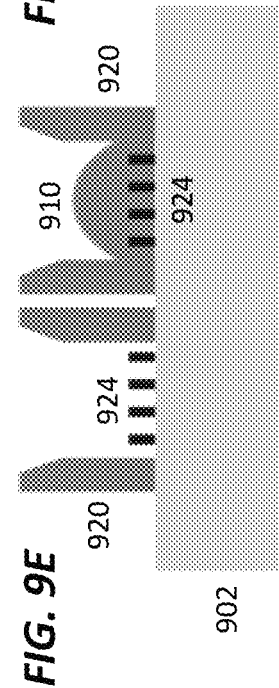

If desired, a photonic transposer can include a combination of meta-structures and refractive optics. FIG. 9E, for instance, shows a hybrid optical structure that includes a polymer lens 910 formed on a meta-structure 924 made of dielectric, semiconductor, and/or metal. Alternatively, FIG. 9F shows a hybrid optical structure 916 with a polymer metasurface formed on the curved surface of a polymer refractive lens.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A photonic interposer comprising:
   a transparent substrate having a first side and a second side opposite the first side; and
   a polymer layer disposed on the first side of the transparent substrate and formed into:
   (i) a free-form optical coupler extending from the first side of the transparent substrate and configured to couple light through the transparent substrate; and
   (ii) a mechanical alignment structure extending from the first side of the transparent substrate and configured to mate with a complementary mechanical alignment structure.

2. The photonic interposer of claim 1, wherein the free-form optical coupler comprises a metasurface.

3. The photonic interposer of claim 1, further comprising:
   a cavity formed in the second side of transparent substrate opposite from the free-form optical coupler; and
   an optical fiber having one end disposed in the cavity,
   wherein the free-form optical coupler is configured to couple light through the transparent substrate and into the optical fiber.

4. The photonic interposer of claim 1, wherein the polymer layer is a first polymer layer, the free-form optical coupler is a first free-form optical coupler, the mechanical alignment structure is a first mechanical alignment structure, and further comprising:
   a second polymer layer disposed on the second side of the transparent substrate and formed into:
   (i) a second free-form optical coupler extending from the second side of the transparent substrate opposite from the first free-form optical coupler; and
   (ii) a second mechanical alignment structure extending from the second side of the transparent substrate.

5. The photonic interposer of claim 1, wherein the polymer layer is a first polymer layer and further comprising:
   a second polymer layer disposed on the second side of the transparent substrate and formed into a fiber holder opposite from the free-form optical coupler and configured to receive an end of an optical fiber.

6. The photonic interposer of claim 5, wherein the second polymer layer is further formed into an optical component configured to focus, redirect, and/or spatially modulate light emitted from and/or coupled into the end of the optical fiber.

7. An assembly comprising:
   the photonic interposer of claim 1; and
   a photonic chip bonded to the photonic interposer and comprising an optical waveguide having a facet mated to a surface of the free-form optical coupler,
   wherein the free-form optical coupler extends into a cavity formed in the photonic chip and the complementary mechanical alignment structure is formed in the photonic chip.

8. The assembly of claim 7, wherein the facet is formed on a wall of the cavity.

9. The assembly of claim 7, further comprising:
   another layer of polymer disposed on a surface of the photonic chip facing the photonic interposer.

10. The assembly of claim 7, wherein the mechanical alignment structure and the complementary mechanical alignment structure form an air gap between the photonic chip and the photonic interposer.

11. The assembly of claim 7, wherein the free-form optical coupler is a first free-form optical coupler, the photonic chip is a first photonic chip, the optical waveguide is a first optical waveguide, the facet is a first facet, and further comprising:
   a second photonic chip bonded to the photonic interposer and comprising a second optical waveguide having a second facet,
   wherein the photonic chip comprises a second polymer layer disposed on the second side of the transparent substrate and formed into a second free-form optical coupler that extends from the photonic chip and into a cavity in the second photonic chip in optical communication with the second facet.

12. The assembly of claim 11, wherein the first optical waveguide is in optical communication with the second optical waveguide via the first free-form optical coupler, the transparent substrate, and the second free-form optical coupler.

13. The assembly of claim 11, further comprising:
   an electrical connection between the first photonic chip and the second photonic chip.

14. A method of making a photonic interposer, the method comprising:
   disposing a polymer layer on a first side of a transparent substrate;
   forming a free-form optical coupler extending from the transparent substrate in the polymer layer;
   forming a mechanical alignment structure extending from the transparent substrate in the polymer layer; and
   forming an optical coupler on a second side of the transparent substrate opposite from the free-form optical coupler.

15. The method of claim 14, wherein forming the optical coupler on the second side of the transparent substrate comprises forming a cavity in the second side of the transparent substrate opposite the free-form optical coupler, and further comprising:
   disposing an end of an optical fiber in the cavity.

16. The method of claim 14, wherein the polymer layer is a first polymer layer and forming the optical coupler on the second side of the transparent substrate comprises:
 disposing a second polymer layer on the second side of the transparent substrate;
 forming a fiber holder in the second polymer layer opposite the free-form optical coupler; and
 disposing an end of an optical fiber in the fiber holder.

17. The method of claim 14, further comprising:
 bonding the photonic interposer to a photonic chip such that the free-form optical coupler extends into a cavity formed in the photonic chip in optical communication with a waveguide formed in the photonic chip.

18. The method of claim 17, wherein bonding the photonic interposer to the photonic chip comprises:
 placing a surface of the free-form optical coupler in direct contact with a facet of the waveguide formed along a wall of the cavity.

19. The method of claim 14, wherein the polymer layer is a first polymer layer, the free-form optical coupler is a first free-form optical coupler, the optical coupler is a second free-form optical coupler, and forming the second free-form optical coupler on the second side of the transparent substrate comprises:
 disposing a second polymer layer on the second side of the transparent substrate;
 forming the second free-form optical coupler extending from the second side of the transparent substrate in the second polymer layer; and
 forming a second mechanical alignment structure extending from the second side of the transparent substrate in the second polymer layer.

20. The method of claim 19, further comprising:
 bonding the photonic interposer to a first photonic chip such that the first free-form optical coupler extends into a cavity formed in the first photonic chip in optical communication with a first waveguide formed in the first photonic chip; and
 bonding the photonic interposer to a second photonic chip such that the second free-form optical coupler extends into a cavity formed in the second photonic chip in optical communication with a second waveguide formed in the second photonic chip.

\* \* \* \* \*